(12) United States Patent
Nuta

(10) Patent No.: US 12,404,798 B2
(45) Date of Patent: *Sep. 2, 2025

(54) DIESEL ENGINE

(71) Applicant: YANMAR HOLDINGS CO., LTD., Osaka (JP)

(72) Inventor: Yoshihiro Nuta, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,226

(22) Filed: May 13, 2024

(65) Prior Publication Data

US 2024/0301812 A1 Sep. 12, 2024

Related U.S. Application Data

(63) Continuation of application No. 18/248,116, filed as application No. PCT/JP2021/039634 on Oct. 27, 2021, now Pat. No. 12,018,603.

(30) Foreign Application Priority Data

Nov. 19, 2020 (JP) ................................. 2020-192649

(51) Int. Cl.
    *F01N 13/18*     (2010.01)
    *B01D 53/94*     (2006.01)
    (Continued)

(52) U.S. Cl.
    CPC ..... *F01N 13/1805* (2013.01); *B01D 53/9418* (2013.01); *B01D 53/9477* (2013.01);
    (Continued)

(58) Field of Classification Search
    CPC ........ B01D 2257/404; B01D 2258/012; B01D 53/9418; B01D 53/9477; B60K 13/04;
    (Continued)

(56) References Cited

U.S. PATENT DOCUMENTS 9,295,946 B2 * 3/2016 Lamps ............... B01D 53/9477
9,534,523 B2 * 1/2017 Sandou .................... B60K 5/12
(Continued)

FOREIGN PATENT DOCUMENTS

JP      2012-219624 A      11/2012
JP      2014-190321 A      10/2014
(Continued)

OTHER PUBLICATIONS

International Search Report for PCT Patent App. No. PCT/JP2021/039634 (Dec. 28, 2021).
(Continued)

*Primary Examiner* — Jesse S Bogue
(74) *Attorney, Agent, or Firm* — Future IP LLC; Tomoko Nakajima

(57) ABSTRACT

A diesel engine is provided with an exhaust after-treatment device for purifying exhaust gas. The exhaust after-treatment device includes a DPF that collects a particulate matter included in the exhaust gas, and an SCR that reduces nitrogen oxides included in the exhaust gas through addition of urea. The DPF is arranged to extend in an engine width direction orthogonal to both the engine front-rear direction and an up-down direction, on one side of the engine front-rear direction with respect to the DPF. The DPF and the SCR are attached to the diesel engine.

8 Claims, 16 Drawing Sheets

(51) Int. Cl.
 F01N 3/033 (2006.01)
 F01N 3/20 (2006.01)
 F01N 13/00 (2010.01)
(52) U.S. Cl.
 CPC ........... F01N 3/033 (2013.01); F01N 3/2066 (2013.01); F01N 13/009 (2014.06); *B01D 2257/404* (2013.01); *B01D 2258/012* (2013.01); *F01N 2610/02* (2013.01)
(58) Field of Classification Search
 CPC .............. F01N 13/009; F01N 13/1805; F01N 13/1855; F01N 2340/00; F01N 2340/02; F01N 2590/08; F01N 2610/02; F01N 3/021; F01N 3/033; F01N 3/2066; Y02T 10/12
 See application file for complete search history.

(56) References Cited

U.S. PATENT DOCUMENTS

| | | | |
|---|---|---|---|
| 9,855,837 B2 * | 1/2018 | Okamura | ............ F01N 13/1805 |
| 10,215,075 B2 | 2/2019 | Chapman et al. | |
| 10,533,474 B2 | 1/2020 | Kimura | |
| 10,669,913 B2 * | 6/2020 | Yamashita | ............. F02M 35/16 |
| 2010/0326054 A1 | 12/2010 | Kato | |
| 2013/0343853 A1 * | 12/2013 | Sato | ....................... E02F 9/0866 |
| | | | 414/719 |
| 2016/0040568 A1 | 2/2016 | Sandou et al. | |
| 2017/0030247 A1 | 2/2017 | Suetou | |
| 2019/0226380 A1 * | 7/2019 | Sandou | ................... F01N 3/035 |
| 2022/0162973 A1 | 5/2022 | Tsushima | |

FOREIGN PATENT DOCUMENTS

| | | | | |
|---|---|---|---|---|
| JP | 2015-21480 A | | 2/2015 | |
| JP | 2015021480 A | * | 2/2015 | ......... B01D 53/9477 |
| JP | 2016-217187 A | | 12/2016 | |
| JP | 2017-145803 A | | 8/2017 | |

OTHER PUBLICATIONS

Japanese Notice of Reasons for Refusal for Patent Application No. 2020-192649 (mailed on Dec. 12, 2023).

* cited by examiner

DIESEL ENGINE

This application is a Continuation under 35 U.S.C. § 120 of U.S. patent application Ser. No. 18/248,116, filed Apr. 6, 2023, which was a national phase entry under 35 U.S.C. § 371 of PCT Patent Application No. PCT/JP2021/039634, filed on Oct. 27, 2021, which claims priority under 35 U.S.C. § 119 to Japanese Patent Application No. 2020-192649, filed Nov. 19, 2020, the entireties of which are incorporated by reference.

TECHNICAL FIELD

The present invention relates to a diesel engine, and in particular to a diesel engine provided with an exhaust after-treatment device.

BACKGROUND ART

Conventionally, it has been widely conducted in a diesel engine that as an exhaust after-treatment device a Diesel Particulate Filter (DPF), which collects particulate matter in exhaust gas, and a Selective Catalytic Reduction (SCR), which causes NOx in the exhaust gas to be reduced by reduction reaction are provided in an exhaust passage, thereby performing purifying treatment for the exhaust gas discharged from an engine.

For example, Patent Literature 1 discloses an exhaust gas purifier equipped with a DPF and an SCR, which are arranged in a front-rear direction of the engine above the engine in such a posture that they extend in the engine width direction.

CITATION LIST

Patent Literature

Patent Literature 1: Japanese Patent Laid-open Publication No. 2016-217187

DISCLOSURE OF INVENTION

Problems to be Solved by the Invention

By the way, there are many parts on an upper side of the engine that require periodic maintenance, such as injectors, valves, etc. (hereinafter, also referred to as "maintenance parts"). Nevertheless, as disclosed in the abovementioned Patent Literature 1, if the DPF and SCR are located on the upper side of the engine, there is a problem that when performing inspection, repair, replacement, etc. of the maintenance parts, it is difficult to perform maintenance efficiently because the DPF and/or SCR must be removed every time.

In light of the foregoing, the present invention has been made, and an object of the present invention is to provide a technology capable of improving maintainability of diesel engines, even if both a DPF and an SCR are provided as exhaust after-treatment devices.

Means for Solving the Problems

In order to achieve the aforementioned object, the present invention is made to provide the diesel engine with a devised layout of the exhaust after-treatment system with a DPF and an SCR.

Specifically, the present invention covers the diesel engines equipped with an exhaust after-treatment device that purifies exhaust.

In the diesel engine, the exhaust after-treatment device has a DPF that collects particulate matter contained in the exhaust gas and an SCR that reduces nitrogen oxides contained in the exhaust gas by adding urea, and the DPF is located extending in an engine front-rear direction parallel to a crankshaft, while the SCR is located extending in an engine width direction orthogonal to both the engine front-rear direction and an up-down direction, on one side of the engine front-rear direction with respect to the DPF.

According to this configuration, the DPF is located extending in the engine front-rear direction, while the SCR is located on one side in the engine front-rear direction with respect to the DPF extending in the engine width direction, so that the DPF and the SCR can be arranged to form a substantially T shape or a substantially L shape in plan view.

Since the DPF and the SCR are arranged to form a substantially T shape or a substantially L shape, even when the DPF and the SCR are arranged above the engine, the area of the upper side of the engine (not covered by the DPF and the SCR) can be increased compared to the case where the DPF and the SCR extending in the same direction are arranged side by side in the same direction. This makes it possible to perform efficient inspection, repair, and replacement of maintenance parts without removing the DPF and/or the SCR, thereby improving maintainability even when the DPF and the SCR are provided as the exhaust after-treatment device.

In the diesel engine mentioned above, the DPF may have an exhaust outlet at an end on a far side from the SCR in the engine front-rear direction to discharge the exhaust gas that collected the particulate matter, and an SCR pipe connecting the exhaust outlet of the DPF and an exhaust inlet of the SCR may have a straight pipe section extending in the engine front-rear direction at a position corresponding to a center in the engine width direction.

According to this configuration, for example, when the upstream side of the straight pipe section in the SCR pipe is defined as the upstream pipe section and the downstream side of the straight pipe section in the SCR pipe is defined as the downstream pipe section, by connecting the exhaust outlet of the DPF and the upstream end of the straight pipe section by the upstream pipe section, the exhaust gas, which is discharged from the exhaust outlet of the DPF after particulate matter is collected, can flow up to the vicinity of the SCR 30 through the upstream pipe section and through the straight pipe section.

The straight pipe section extends in the engine front-rear direction at a position corresponding to the center in the engine width direction, so that no matter where the exhaust inlet of the SCR is located in the SCR in the engine width direction, the same layout of the upstream pipe section and the straight pipe section can be used without being affected by changes in the shape, standard, etc. of the SCR, since it is possible to handle only by changing the shape or the length of the downstream pipe section.

Since the downstream end of the straight pipe section is always located in the center of the engine width direction, even if the exhaust inlet of the SCR is located on one side or the other side in the engine width direction in the SCR, the downstream pipe section does not need to be extremely long, this make it possible to reduce a cost for manufacturing the SCR pipe from increasing while to increase the design freedom of the SCR.

Furthermore, in the diesel engine mentioned above, the SCR may be located at a position lower than the DPF, and the SCR pipe further may have a downstream pipe section connected to a downstream end of the straight pipe section, and the downstream pipe section may bend at the downstream end of the straight pipe section in the engine width direction, extend in the engine width direction above the SCR, and connect with the exhaust inlet of the SCR.

According to this configuration, by locating the SCR at a position lower than the DPF, for example, the SCR pipe, which are the same height as the DPF and extends in the engine front-rear direction, can be extended up to above the SCR, so that during passing through such relatively long SCR pipe, the mixing of the exhaust gas and the ammonia gas (urea) can be accelerated.

In the diesel engine mentioned above, the DPF may be located on an upper side of a cylinder head, while the SCR may be located on one side of in the engine front-rear direction with respect to the cylinder head, and the diesel engine further may comprise a bracket to secure the DPF and the SCR to the cylinder head.

According to this configuration, compared to the case where the DPF and the SCR are fixed separately to the cylinder head via separate brackets, it is possible to attain light weight and cost down due to reduction of the number of parts.

Furthermore, in the diesel engine mentioned above, the bracket may have a first bracket member to fix the SCR to the cylinder head and a second bracket member to fix an end of the DPF closer to the SCR to the first bracket member, and the second bracket member may enable the DPF with a different length to be fixed to the first bracket member by changing a mounting direction to the first bracket member.

According to this configuration, the second bracket member is configured to be able to fix the DPFs with different lengths to the first bracket member by changing the mounting direction to the first bracket member, so that even when the lengths of the DPFs are different, the DPF and the SCR can be fixed to the cylinder head without changing the shape, etc. of the first bracket member and the second bracket member, in other words, using the same bracket. Therefore, even when the length of the DPF is different, there is no need to manufacture a dedicated bracket every time, thereby reducing the manufacturing cost from increasing.

In the diesel engine mentioned above, the second bracket member may have at least a base portion attached to the first bracket member and a mount portion rising from an end of the base portion and attached to the end of the DPF closer to the SCR, the base portion may be attachable to the first bracket member with any of postures in which a base portion side of the mount portion faces a DPF side and the base portion side of the mount portion faces an SCR side, and the mount portion may be attachable to the end of the DPF closer to the SCR at any of a surface on a base portion side of the mount portion and a surface opposite to the base portion side of the mount portion.

According to this configuration, for example, when the length of the DPF is relatively short (when the end closer to the SCR in the DPF is relatively far from the SCR), the base portion is attached to the first bracket member with a posture that the base portion side of the mount portion faces the SCR side, as well as the mount portion is attached on the side opposite to the base portion side of the mount portion to the end of the DPF closer to the SCR. This makes it possible to fix the DPF to the first bracket member via the second bracket.

On the other hand, for example, when the length of the DPF is relatively long (when the end closer to the SCR in the DPF is relatively closer to the SCR), the base portion is attached to the first bracket member with a posture that the base portion side of the mount portion faces the DPF side, as well as the mount portion is attached on the base portion side of the mount portion to the end of the DPF closer to the SCR. This makes it possible to fix the DPF to the first bracket member via the second bracket.

Furthermore, in the diesel engine mentioned above, the base portion may be attached to the first bracket member via a fastening member that is inserted through a long hole formed in the base portion.

According to this configuration, the same bracket can be used to handle the DPF with various lengths, since a distance between the end of the DPF closer to the SCR and the second bracket member (mount portion) can be largely adjusted by changing the posture of the base portion as well as the long hole enables the distance between the end of the DPF closer to the SCR and the mount portion to be finely adjusted.

In the diesel engine mentioned above, the first bracket member may be attached directly or via a spacer to a mounting member fixed to a flange provided on the SCR.

According to this configuration, the same bracket can be used to secure the SCR to the cylinder head, even when the length of the SCR is different.

Effect of the Invention

As explained above, according to the diesel engine of the present invention, the maintainability thereof can be improved even if both the DPF and the SCR are provided as exhaust after-treatment devices.

DESCRIPTION OF EMBODIMENTS

Embodiments for carrying out the present invention will be described below with reference to the accompanying drawings. In the following, a description is given in such a manner that a direction parallel to a crankshaft CS is defined as an engine front-rear direction, and a direction orthogonal to both the engine front-rear direction and an up-down direction is defined as an engine width direction. Also, in each of the drawings, an arrow Fw indicates the front side in the engine front-rear direction, an arrow Rh indicates the right side in the engine width direction, and an arrow Up indicates the upper side in the up-down direction.

Figure 1:
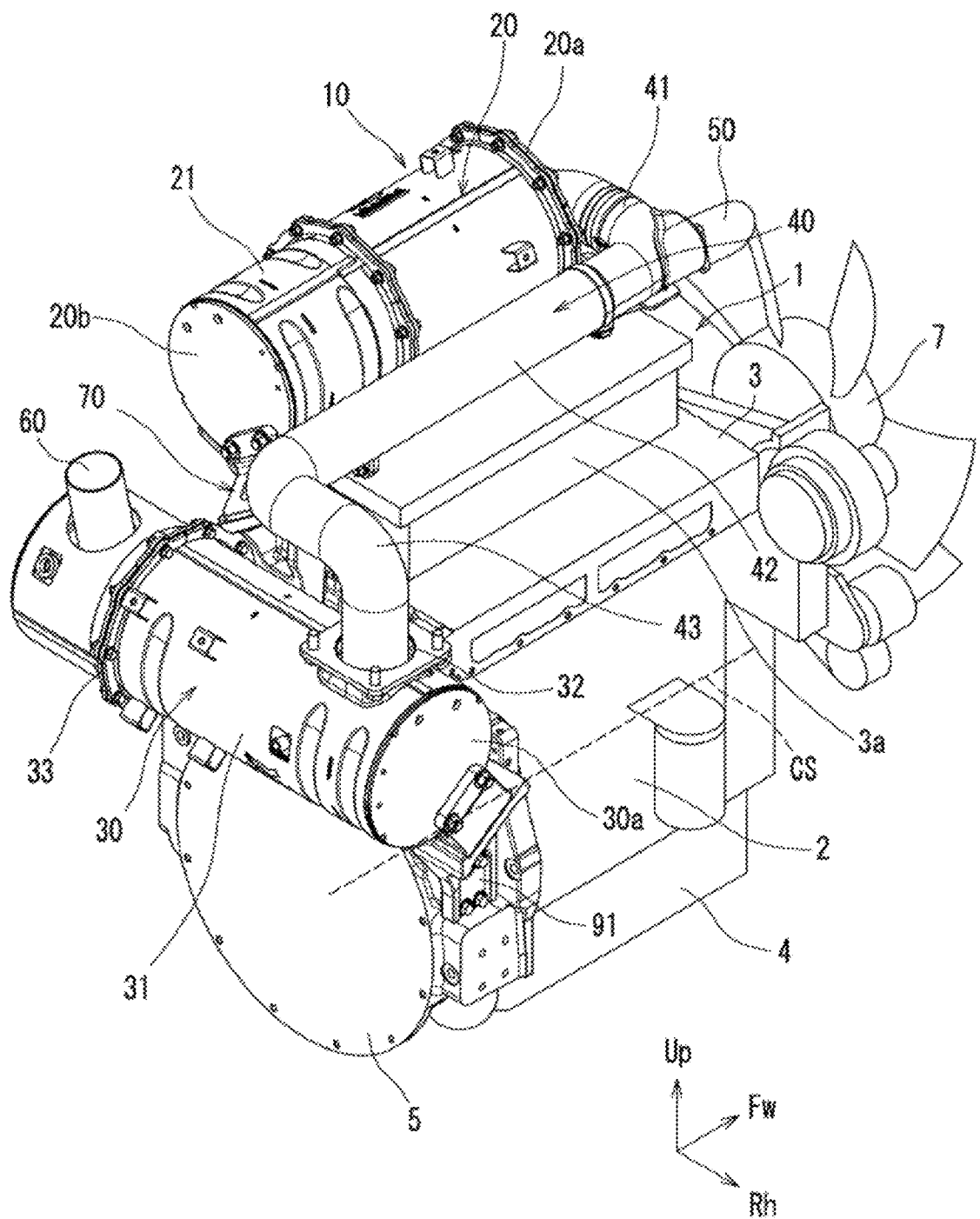
FIG. 1 is a perspective view schematically illustrating a diesel engine according to an embodiment of the present invention.
Figure 2:
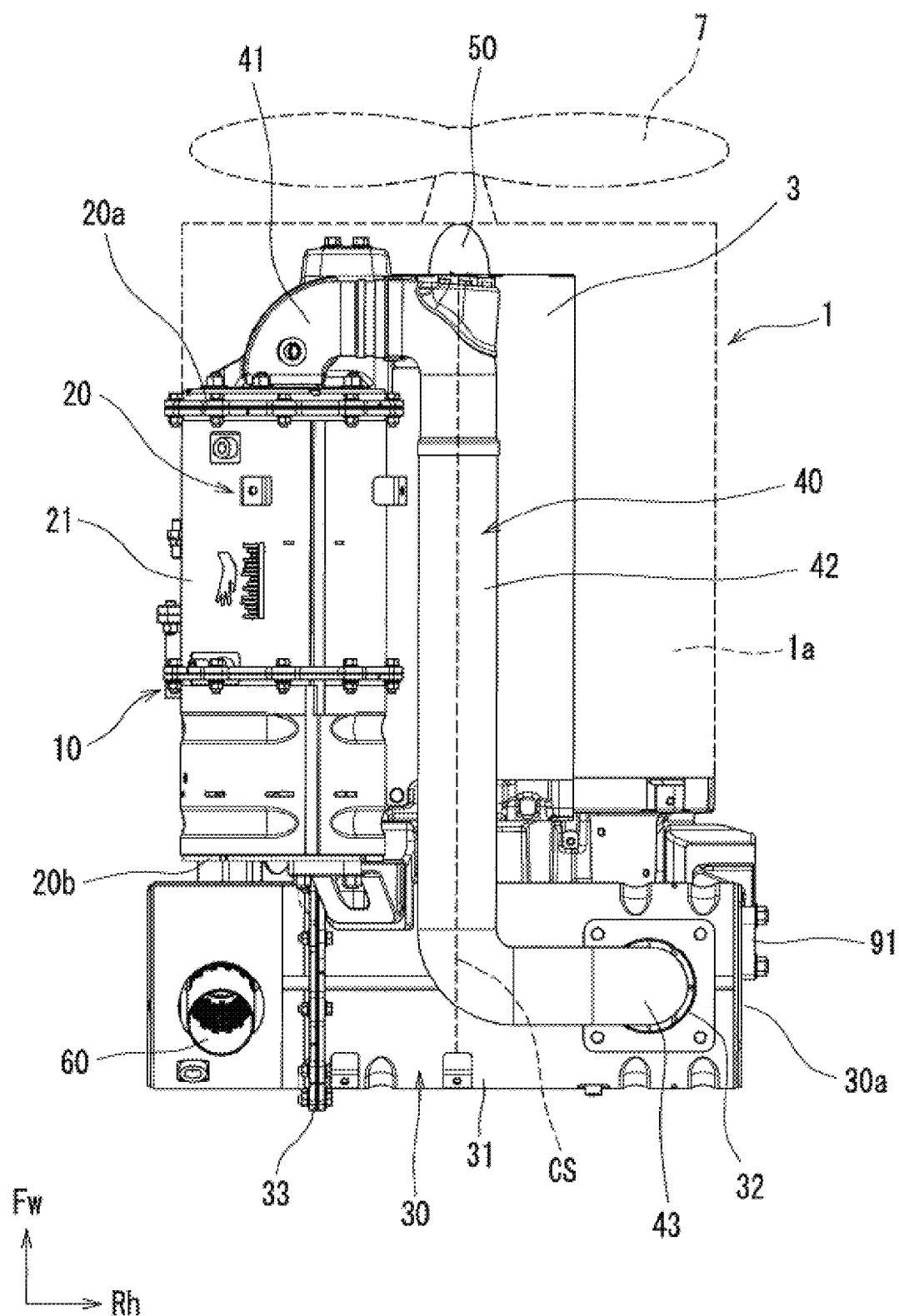
FIG. 2 is a plan view schematically illustrating a main part of the diesel engine shown in FIG. 1.

FIG. 1 is a perspective view schematically illustrating a diesel engine 1 according to an embodiment of the present invention, and FIG. 2 is a plan view schematically illustrating a main part of the diesel engine 1. As shown in FIGS. 1 and 2, the diesel engine 1 includes an engine body 1a with a cylinder head 3 fastened to the top of a cylinder block 2, an exhaust manifold (not shown), an intake manifold (not shown), a flywheel (not shown) housed in a flywheel housing 5, a cooling fan 7, an EGR system (not shown), an intake throttle system (not shown), a turbocharger (not shown), and an exhaust after-treatment device 10 that purifies exhaust air.

The cylinder block 2 contains a plurality of pistons (not shown) which reciprocates up and down within a plurality of cylinders, respectively, and a crankshaft (crankshaft shaft) CS which is connected to the pistons via connecting rods (not shown). The oil pan 4 to store oil which is circulated in the diesel engine 1 to lubricate each part is fixed to a lower side of the cylinder block 2.

While the intake manifold is connected to the cylinder head 3 on the right side in the engine width direction, the exhaust manifold is connected to the cylinder head 3 on the left side in the engine width direction. In other words, the diesel engine 1 according to the present embodiment is configured so that the left side in the engine width direction is the exhaust side and the right side in the engine width direction is the intake side. A head cover 3a is fixed to the top of the cylinder head 3.

As shown in FIG. 1, a flywheel housing 5 which houses the flywheel is provided on the rear side in the engine front-rear direction of the engine body 1a. On the other hand, as shown in FIG. 2, the cooling fan 7 is provided on the front side of the engine body 1a in the engine front-rear direction. The cooling fan 7 is rotated by rotational power transmitted from the crankshaft CS.

The diesel engine 1 according to the present embodiment is also equipped with an EGR system, so that a portion of the exhaust gas discharged from each combustion chamber to the exhaust manifold via the exhaust port is returned (recirculated) to the intake side. In this way, by mixing a portion of the exhaust gas with the intake air, a combustion temperature can be lowered and thus nitrogen oxides (NOx) in the exhaust gas can be reduced.

A turbocharger is installed on the exhaust side of the diesel engine 1. Fresh air having been dusted out by the air cleaner (not shown) is compressed by the turbocharger, sent to the intake manifold via an intake throttle device on the intake side, and then mixed with the returned exhaust gas in the intake manifold to be supplied to each cylinder.

Exhaust After-Treatment Device (hereinafter, also referred to as "ATD") 10 has a DPF (Diesel Particulate Filter) 20, an SCR (Selective Catalytic Reduction) 30, an SCR pipe 40 connecting the DPF 20 and the SCR 30, and a dosing module (a Urea injection system) 50 which is installed on the upstream side of the SCR pipe 40.

The DPF 20 is structured such that an oxidation catalyst (not shown) and a soot filter (not shown) are arranged in series, and are accommodated in a DPF casing 21. In the DPF 20, when exhaust gas flowing into the DPF casing 21 from an exhaust introduction port (not shown) passes through the soot filter, particulate matter in the exhaust gas is collected by the soot filter. Furthermore, when the exhaust gas passes through the oxidation catalyst, if an exhaust gas temperature exceeds a regenerable temperature, the particulate matter deposited on the soot filter is combustion-removed by oxygen getting higher temperature due to oxidation catalyst action, and the soot filter is regenerated.

An SCR 30 is structured such that an SCR catalyst for urea selective catalytic reduction (not shown) and an oxidation catalyst (not shown) are arranged in series, and are accommodated in an SCR casing 31. An upstream end of the SCR casing 31 is connected to a downstream end of the DPF casing 21 via the SCR pipe 40 that is relatively long. In the SCR pipe 40, ammonia gas is generated by injecting urea water from the dosing module 50 to the exhaust gas flowing into from the DPF 20, so that mixing of the exhaust gas and the ammonia gas is promoted during passing through the relatively long SCR pipe 40. In the SCR 30, when the exhaust gas and the ammonia gas flowing into the SCR casing 31 pass through the SCR catalyst, the nitrogen oxides in the exhaust gas chemically react with ammonia, and are reduced to nitrogen and water, as well as the ammonia is reduced when the exhaust gas and the ammonia gas pass through the oxidation catalyst.

In this way, exhaust gas, from which particulate matter is removed by the DPF 20 and nitrogen oxides are reduced by SCR 30, is discharged from a tail pipe 60 provided at the downstream end of the SCR casing 31.

Layout of DPF and SCR

Figure 16:
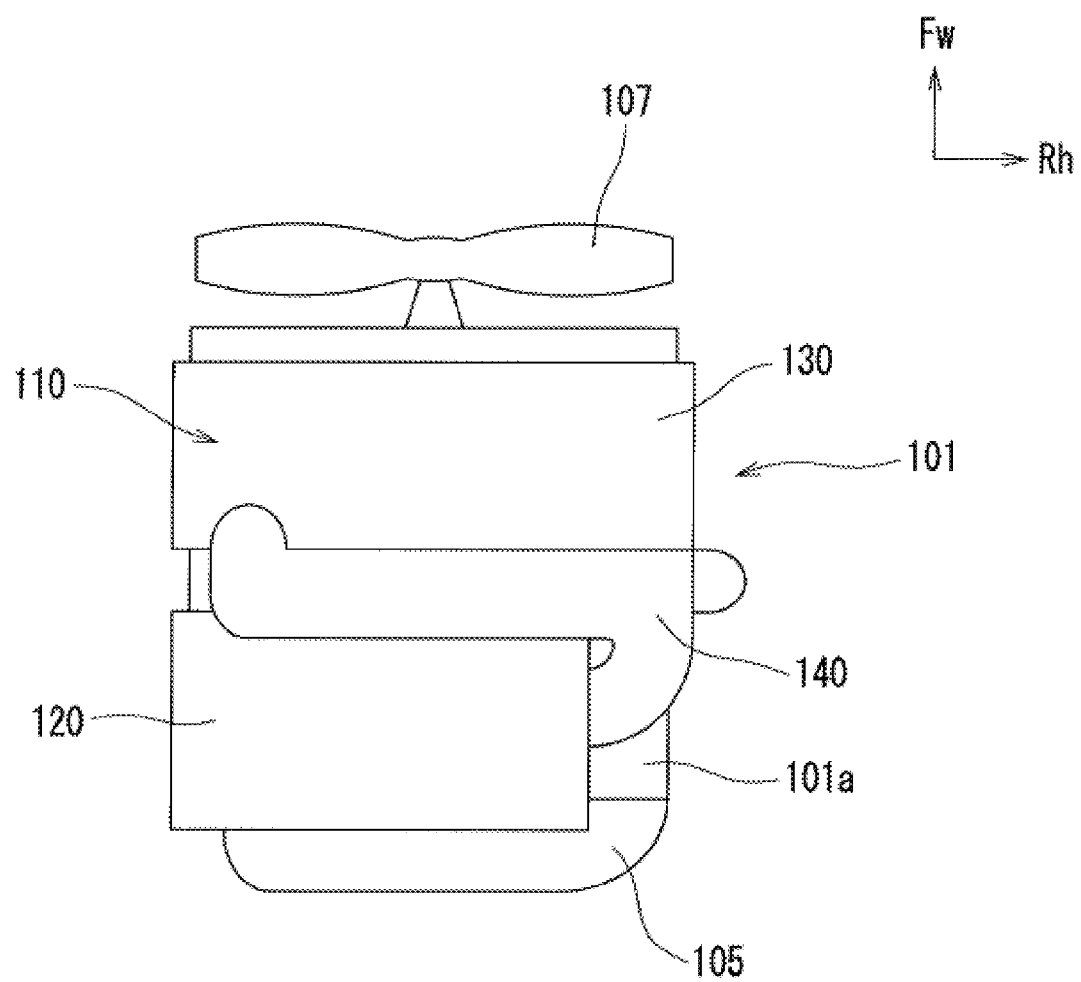
FIG. 16 is a plan view schematically illustrating a conventional diesel engine.

FIG. 16 is a plan view schematically illustrating a conventional diesel engine 101. As shown in FIG. 16, the conventional diesel engine 101 is similar to the diesel engine 1 according to the present embodiment in that the conventional diesel engine 101 also has an engine body 101a, a flywheel housing 105, a cooling fan 107, and an exhaust after-treatment device 110 that purifies exhaust.

However, in the conventional diesel engine 101, the DPF 120 and the SCR 130 of the exhaust after-treatment device 110, which are connected by the SCR pipe 140, are arranged side by side on the top of the engine body 101a in the engine front-rear direction with a posture that the DPF 120 and the SCR 130 extend in the engine width direction.

By the way, there are many parts on an upper side of the engine body 101a that require periodic maintenance, such as injectors, valves, etc. (hereinafter, also referred to as "maintenance parts"). Nevertheless, as in the conventional diesel engine 101, if the DPF 120 and the SCR 130 are arranged on the upper side of the engine body 101a, the upper part of the engine body 101a is hidden, as shown in FIG. 16. Therefore, there is a problem that when performing inspection, repair, replacement, etc. of the maintenance parts, it is difficult to perform maintenance efficiently because the DPF 120 and/or SCR 130 must be removed every time.

In the diesel engine 1 according to the present embodiment, a layout of DPF 20 and SCR 30 is devised. Specifically, as shown in FIG. 2, in the diesel engine 1 according to the present embodiment, the DPF 20 is located above the engine body 1a (more precisely, above the head cover 3a) extending in the engine front-rear direction, while the SCR 30 is located above the flywheel housing 5 which is on the rear side (one side) from the DPF 20 in the engine front-rear direction. The SCR 30 is located above the flywheel housing 5 so that the SCR 30 is located at a position lower than the DPF 20 as well as a center of the SCR 30 in the engine width direction overlaps the crankshaft CS in plan view.

As shown in FIG. 2, the DPF 20 and the SCR 30 are arranged to form a substantially L shape in plan view because the DPF 20 is located on the upper side of the engine body 1a extending in the engine front-rear direction, while the SCR 30 is located on the rear side from the DPF 20 in the engine front-rear direction extending in the engine width direction.

Since the DPF 20 and the SCR 30 are arranged to form a substantially L shape, as shown in FIG. 2, the area of the upper side of the engine body 1a (not covered by the DPF 20 and the SCR 30) can be increased compared to the conventional diesel engine 101 in which the DPF 120 and the SCR 130 extending in the engine width direction are arranged side by side in the engine front-rear direction. This makes it possible to perform efficient inspection, repair, and replacement of maintenance parts without removing the DPF 20 and/or SCR 30, thereby improving maintainability even when the DPF 20 and the SCR 30 are provided as the exhaust after-treatment device 10.

Layout of SCR Pipe

In the DPF 20, an exhaust outlet 22 (see FIG. 12), from which the exhaust gas is discharged after particulate matter is collected, is provided at the end of the front side (front end 20a) (the end farther from SCR 30) in the engine front-rear direction. In addition, in the SCR 30, an exhaust inlet 32 is provided at the end of the right side (right end 30a) in the engine width direction, while a tail pipe 60 is provided at the end of the left side in the engine width direction. As shown in FIG. 1, in the diesel engine 1, the exhaust outlet 22 of the DPF 20 and the exhaust inlet 32 of the SCR 30 are connected by the SCR pipe 40.

By the way, since the tail pipe 60, which is at a position of the most downstream of an ATD 10, is connected to an exhaust pipe on the side of the vehicle body (not shown), the tail pipe 60 can be set at various positions in the SCR 30 depending on the layout of the vehicle body. In particular, it is very important from the vehicle body's view which side of the diesel engine 1 the tail pipe 60 is set on, and it is desirable that the tail pipe 60 can be set on any right or left side of the diesel engine 1.

Figure 3:
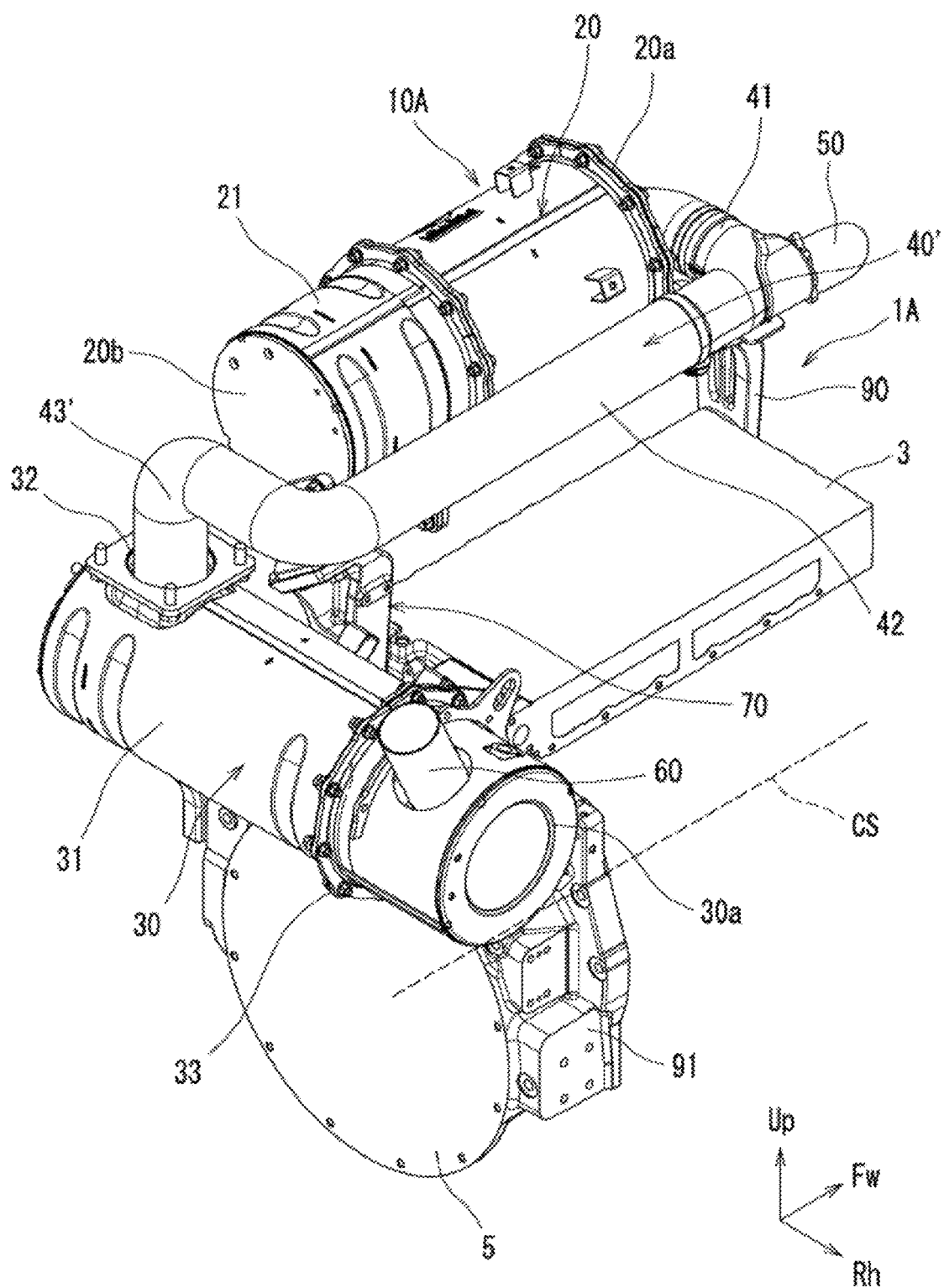
FIG. 3 is a perspective view schematically illustrating a main part of the diesel engine.
Figure 4:
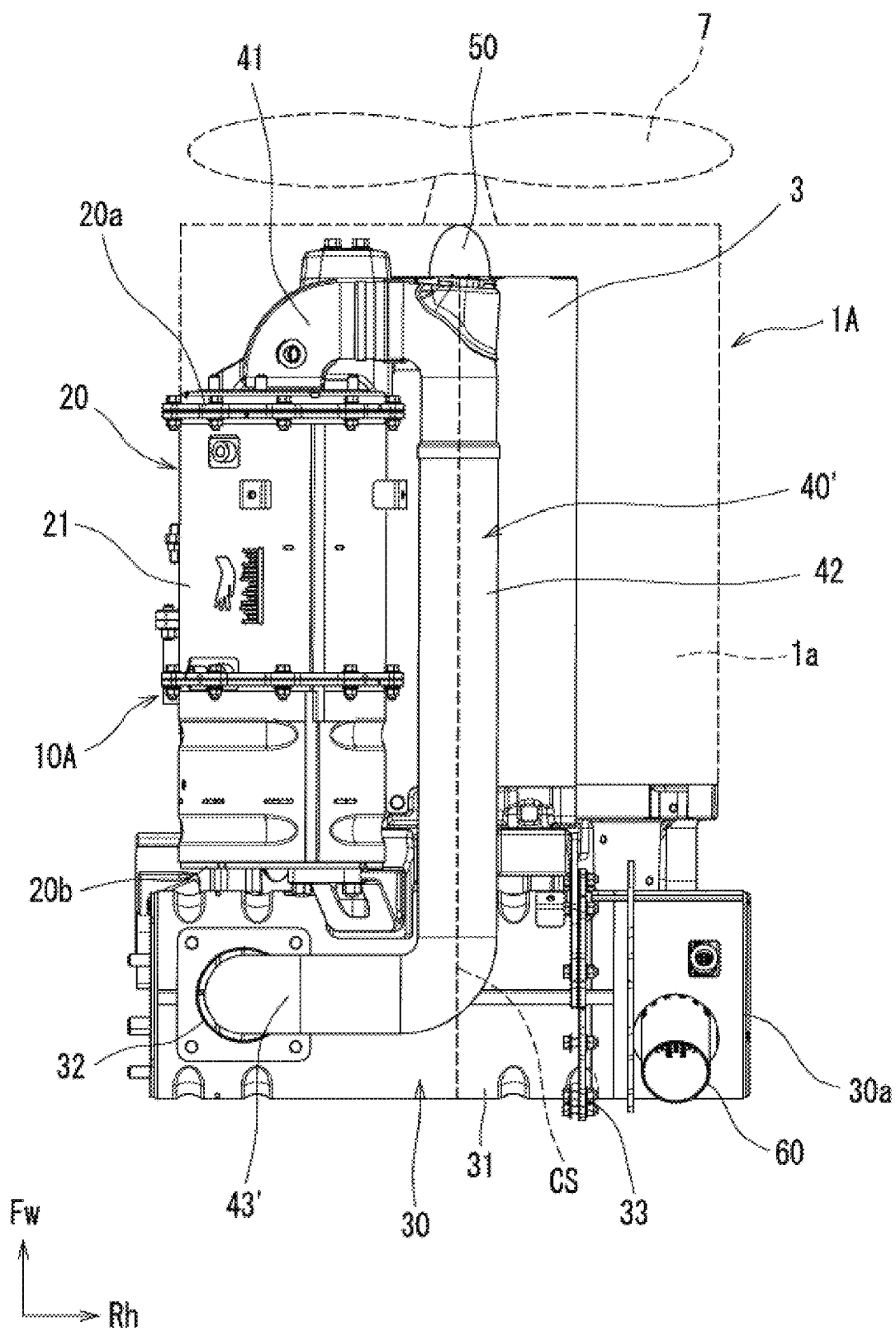
FIG. 4 is a plan view schematically illustrating a main part of the diesel engine shown in FIG. 3.

FIG. 3 is a perspective view schematically illustrating a main part of the diesel engine 1A, and FIG. 4 is a plan view schematically illustrating a main part of the diesel engine 1A. The diesel engine 1A is substantially the same as the diesel engine 1, and the same components are denoted by an identical symbol or numeral.

As shown in FIG. 3, in an ATD 10A of the diesel engine 1A, the SCR 30 is installed in such an arrangement that the SCR 30 of the diesel engine 1A is a mirror image of the SCR 30 of the diesel engine 1. Therefore, in the SCR 30, the tail pipe 60 is provided at the end of the right side in the engine width direction, while the exhaust inlet 32 is provided at the end of the left side of the engine width direction. In the diesel engine 1A, the exhaust outlet 22 of the DPF 20 and the exhaust inlet 32 of the SCR 30 are connected by a SCR pipe 40', as shown in FIG. 1.

In this way, in the diesel engine 1, the exhaust outlet 22 of the DPF 20 and the exhaust inlet 32 of the SCR 30 are connected by the SCR pipe 40, while in the diesel engine 1A, the exhaust outlet 22 of the DPF 20 and the exhaust inlet 32 of the SCR 30 are connected by the SCR pipe 40' different from the SCR pipe 40. However, it is uneconomical to manufacture the SCR pipe 40' that is completely different from the SCR pipe 40, even though the diesel engine 1 and the diesel engine 1A have substantially the same configuration.

Therefore, in the present embodiment, the SCR pipes 40, 40' that connect the exhaust outlet 22 of the DPF 20 and the exhaust inlet of the SCR 30 have a straight pipe section 42 that extends in the engine front-rear direction at a position corresponding to the center in the engine width direction.

More specifically, both the SCR pipe 40 and the SCR pipe 40' are connected to the exhaust outlet 22 of the DPF 20 and have an upstream pipe section 41 that extends slightly toward the front side in the engine front-rear direction and then bends 180 degrees to extend toward the rear side in the engine front-rear direction. Both the SCR pipe 40 and the SCR pipe 40' are connected to a downstream end of the upstream pipe section 41 and have a straight pipe section 42 that extends in the engine front-rear direction at a position corresponding to the center in the engine width direction. In the present embodiment, as described above, the center of the SCR 30 in the engine width direction is located so as to overlap the crankshaft CS in plan view, so that the straight pipe section 42 extending in the engine front-rear direction so as to overlap the crankshaft CS in plan view forms a substantially T shape along with the SCR 30 in plan view.

As shown in FIGS. 1 and 2, the SCR pipe 40 has a downstream pipe section 43 that is connected to the downstream end of the straight pipe section 42, bends to the right side in the engine width direction, extends to the right side in the engine width direction above the SCR 30, and then bends downward to connect to the exhaust inlet 32 of the SCR 30.

In contrast, as shown in FIGS. 3 and 4, the SCR pipe 40' has a downstream pipe section 43' that is connected to the downstream end of the straight pipe section 42, bends to the left side in the engine width direction, extends to the left side in the engine width direction above the SCR 30, and then bends downward to connect to the exhaust inlet 32 of the SCR 30.

In this way, by connecting the exhaust outlet 22 of the DPF 20 and the upstream end of the straight pipe section 42 by the upstream pipe section 41, in both the SCR pipe 40 and the SCR pipe 40', the exhaust gas, which is discharged from the exhaust outlet 22 of the DPF 20 after particulate matter is collected, can flow up to the vicinity of the SCR 30 through the upstream pipe section 41 and through the straight pipe section 42.

The straight pipe section 42 extends in the engine front-rear direction at a position corresponding to the center in the engine width direction so that the straight pipe section 42 forms a T shape along with the SCR 30 in plan view, so that a positional relationship between the downstream end of the straight pipe section 42 and the SCR 30 can be always substantially the same. Therefore, no matter where the exhaust inlet 32 of the SCR 30 is located in the SCR 30 in the engine width direction, the same layout of the upstream pipe section 41 and the straight pipe section 42 can be used without being affected by changes in the shape, standard, etc. of the SCR 30, since it is possible to handle only by changing the shape or the length of the downstream pipe sections 43 and 43'.

Since the downstream end of the straight pipe section 42 is always located in the vicinity of the center of the SCR 30, even if the exhaust inlet 32 of the SCR 30 is located at the end of the right side in the engine width direction in the SCR 30 as shown in the diesel engine 1, or even if the exhaust inlet 32 of the SCR 30 is located at the end of the left side in the engine width direction in the SCR 30 as shown in the diesel engine 1A, the downstream pipe sections 43 and 43' do not need to be extremely long, this make it possible to reduce a cost for manufacturing the SCR pipe 40 from increasing while to increase the design freedom of the SCR 30.

Furthermore, by locating the SCR 30 at a position lower than the DPF 20, for example, the SCR pipes 40, 40', which are the same height as the DPF 20 and extend in the engine front-rear direction, can be extended up to above the SCR 30, so that during passing through such relatively long SCR pipes 40, 40', the mixing of the exhaust gas and the ammonia gas (urea) can be accelerated.

Fixing Structure of DPF and SCR

Figure 5:
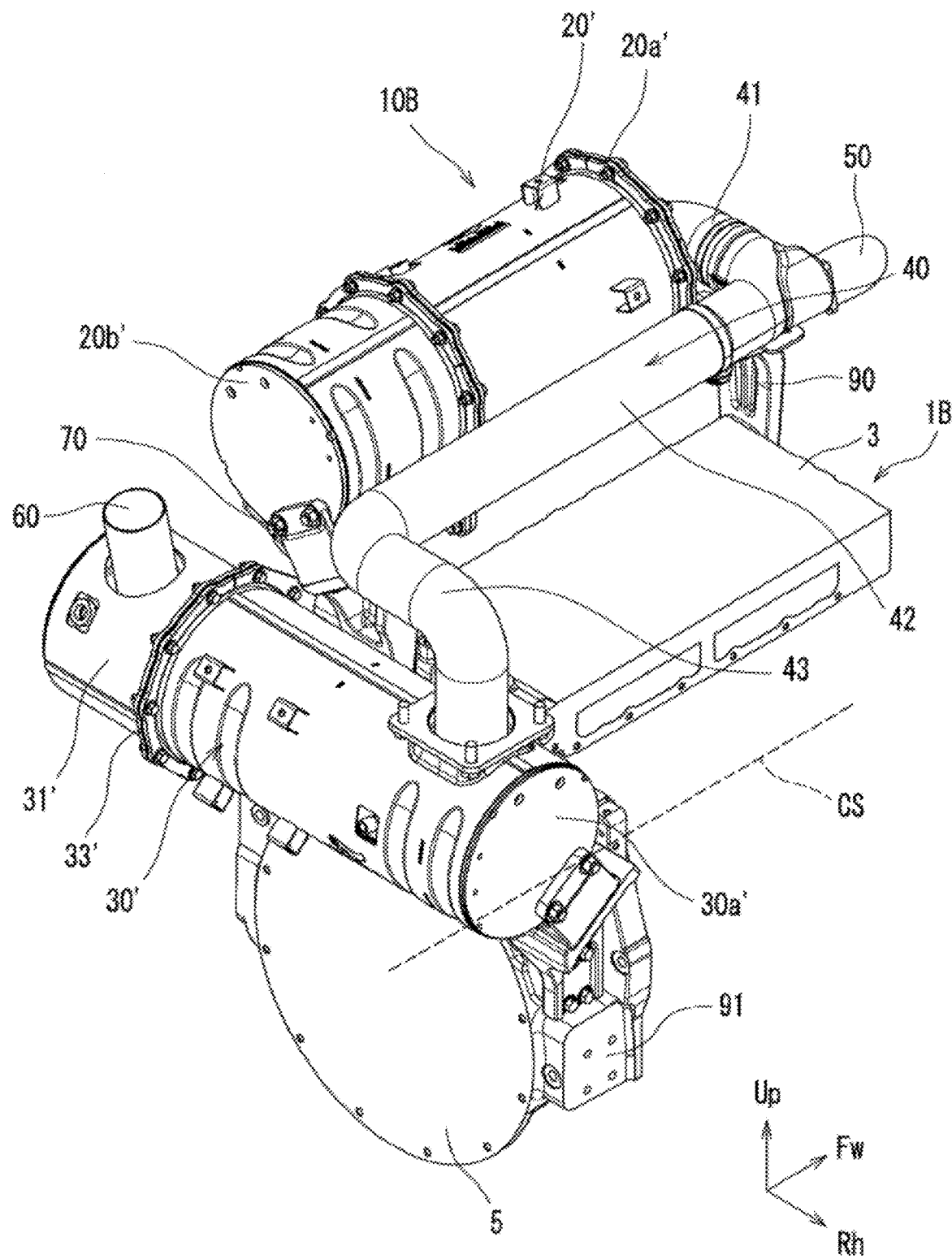
FIG. 5 is a perspective view schematically illustrating a main part of the diesel engine.
Figure 6:
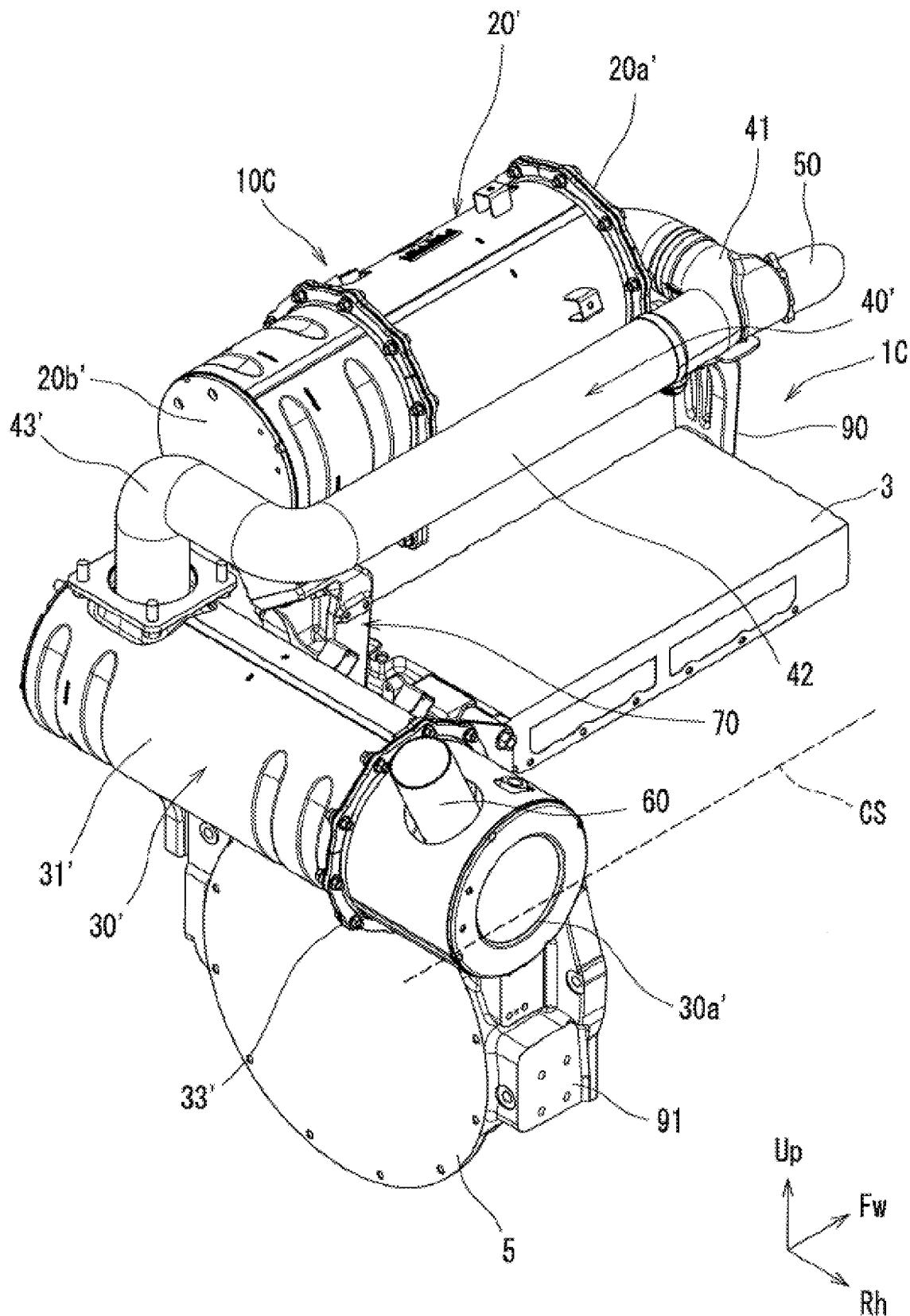
FIG. 6 is a perspective view schematically illustrating a main part of the diesel engine.

FIG. 5 is a perspective view schematically illustrating a main part of the diesel engine 1B, and FIG. 6 is a perspective view schematically illustrating a main part of the diesel engine 1C. Since the diesel engine 1B is substantially the same as the diesel engine 1, and the diesel engine 1C is substantially the same as the diesel engine 1A, the same components are denoted by an identical symbol or numeral.

There is a difference between the diesel engine 1 and the diesel engine 1B that the diesel engine 1B has a higher power specification than the diesel engine 1, and accordingly, the DPF 20' of the diesel engine 1B is formed so as to be longer than the DPF 20 of the diesel engine 1 in the engine front-rear direction, and the SCR 30' of the diesel engine 1B is formed so as to be longer than the SCR 30 of the diesel engine 1 in the engine width direction. Similarly, there is a difference between the diesel engine 1A and the diesel engine 1C that the diesel engine 1C has a higher power specification than the diesel engine 1A, and accordingly, the DPF 20' of the diesel engine 1C is formed so as to be longer than the DPF 20 of the diesel engine 1A in the engine front-rear direction, and the SCR 30' of the diesel engine 1C is formed so as to be longer than the SCR 30 of the diesel engine 1A in the engine width direction.

However, it is uneconomical to employ completely different fixing structures for the DPFs 20 and 20' and for the SCRs 30 and 30', respectively, even though the diesel engine 1 and the diesel engine 1B have substantially the same configuration except for the difference in length between the DPFs 20 and 20' and the difference in length between the SCRs 30 and 30'. Similarly, this can be also applied to a relationship between the diesel engine 1A and the diesel engine 1C.

Therefore, the DPFs 20 and 20' and the SCRs 30 and 30' are fixed to the engine bodies 1a by a substantially identical fixing structure, respectively. As a representative example, a fixing structure of the DPF 20 and the SCR 30 in the diesel engine 1 and a fixing structure of the DPF 20' and the SCR 30' in the diesel engine 1B are described below.

Figure 7:
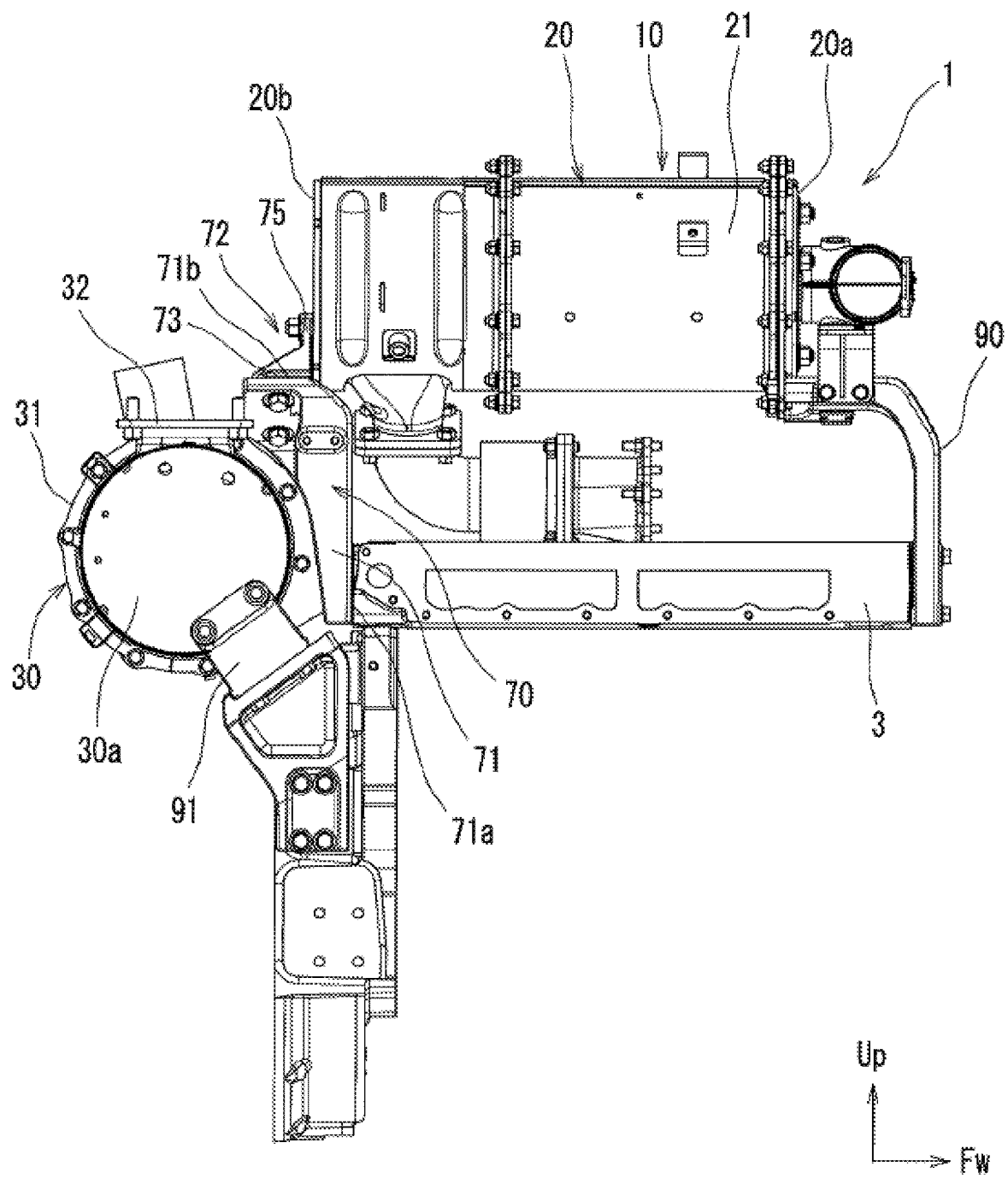
FIG. 7 is a side view seen from the right side in the engine width direction, which schematically illustrates a main part of the diesel engine shown in FIG. 1.
Figure 8:
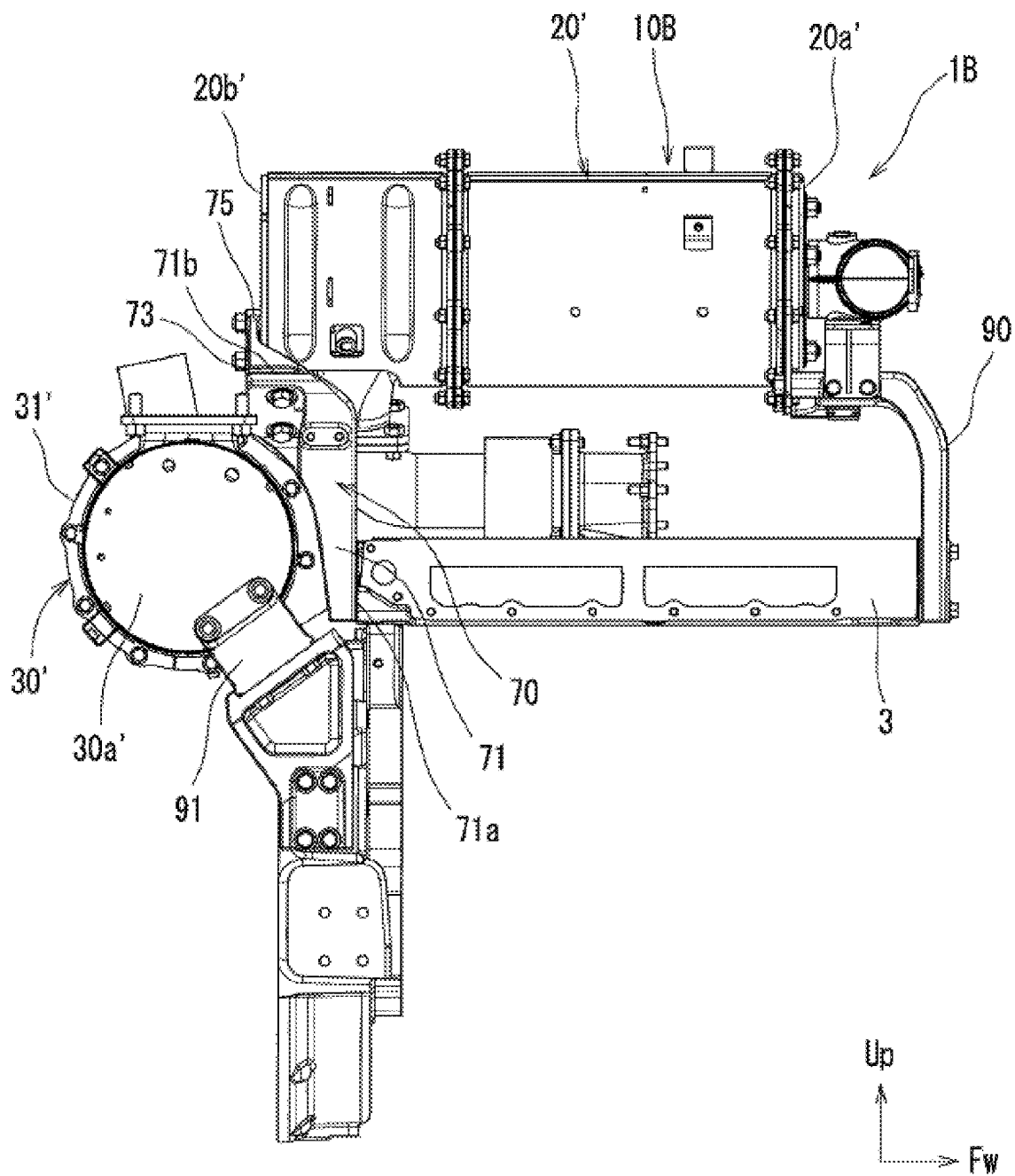
FIG. 8 is a side view seen from the right side in the engine width direction, which schematically illustrates a main part of the diesel engine shown in FIG. 5.
Figure 9:
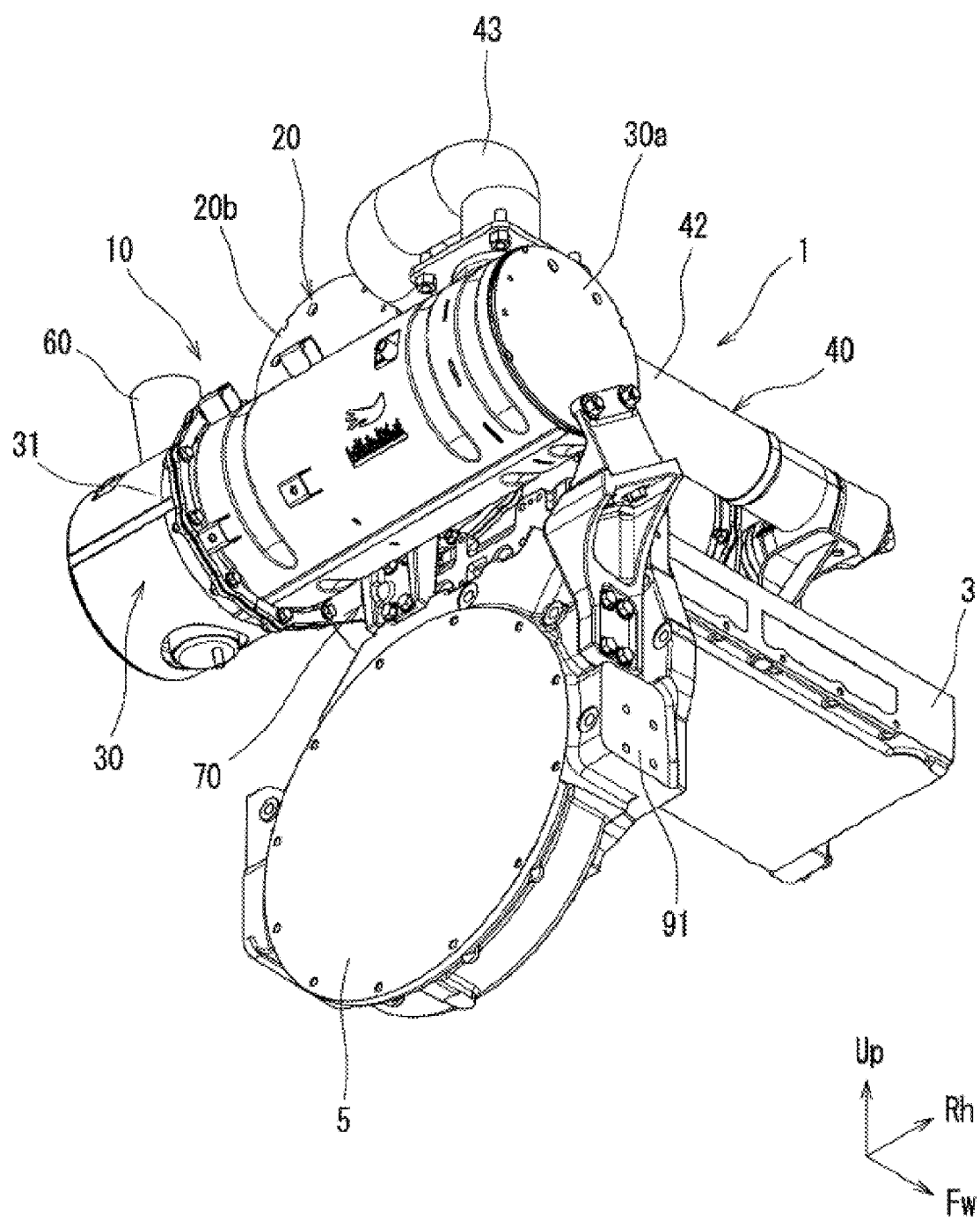
FIG. 9 is a perspective view schematically illustrating an end of an SCR on the right side in the engine width direction in the diesel engine shown in FIG. 1.

FIG. 7 is a side view seen from the right side in the engine width direction, which schematically illustrates a main part of the diesel engine 1, FIG. 8 is a side view seen from the right side in the engine width direction, which schematically illustrates a main part of the diesel engine 1B, and FIG. 9 is a perspective view schematically illustrating an end of the SCR 30 on the right side in the engine width direction in the diesel engine 1. For simplicity of drawing, the SCR pipe 40 and the SCR pipe 40' are omitted in FIGS. 7 and 8.

In the diesel engine 1, the DPF 20 is supported at two points on the cylinder head 3 by fixing the front end 20a and the end of the rear side (rear end) 20b in the engine front-rear direction to the cylinder head 3. The SCR 30 is supported at two points on the engine body 1a by fixing the end of the right side (right end) 30a in the engine width direction to the flywheel housing 5 and fixing a flange portion 33 formed on the left side of the SCR casing 31 in the engine width direction to the cylinder head 3.

On the other hand, also in the diesel engine 1B, the DPF 20' is supported at two points on the cylinder head 3 by fixing the end of the front side (front end) 20a' in the engine front-rear direction and the end of the rear side (rear end) 20b' in the engine front-rear direction to the cylinder head 3. Furthermore, the SCR 30' is supported at two points on the engine body 1a by fixing the end of the right side (right end) 30a' in the engine width direction to the flywheel housing 5 and fixing a flange portion 33' formed on the left side of the SCR casing 31' in the engine width direction to the cylinder head 3.

More specifically, as shown in FIG. 7, in the diesel engine 1, the front end 20a of the DPF 20 is fixed to the front end of the cylinder head 3 via a DPF bracket 90 that is fastened with bolts to the front end 20a and the front end of the cylinder head 3. Similarly, as shown in FIG. 8, also in the diesel engine 1B, the front end 20a' of the DPF 20' is fixed to the front end of the cylinder head 3 via a DPF bracket 90 that is fastened with bolts to the front end 20a' and the front end of the cylinder head 3.

On the other hand, as shown in FIGS. 7 and 9, in the diesel engine 1, the right end 30a of the SCR 30 is fixed to the right end of the flywheel housing 5 via a SCR bracket 91 that is fastened with bolts to the right end 30a and the right end of the flywheel housing 5. Similarly, as shown in FIG. 8, in the diesel engine 1B, the right end 30a' of the SCR 30' is fixed to the right end of the flywheel housing 5 via the SCR bracket 91 that is fastened with bolts to the right end 30a' and the right end of the flywheel housing 5.

As shown in FIG. 7, in the diesel engine 1, the rear end 20b of the DPF 20 and the flange portion 33 of the SCR 30 are fixed to the rear end of the cylinder head 3 via a common bracket 70.

By fixing the DPF 20 and the SCR 30 to the cylinder head 3 via the common bracket 70, compared to the case where the DPF 20 and the SCR 30 are fixed separately to the cylinder head 3 via separate brackets, it is possible to attain light weight and cost down due to reduction of the number of parts.

Also in the diesel engine 1B, as shown in FIG. 8, the rear end 20b' of the DPF 20' and the flange portion 33' of the SCR 30' can be fixed to the rear end of the cylinder head 3 via the common bracket 70 used in the diesel engine 1. Namely, the bracket 70 is configured to be applicable to the DPFs 20 and 20' that have different lengths and the SCRs 30 and 30' that have different lengths. Such the bracket 70 is described in detail below.

The bracket 70 has a first bracket member 71 that secures the SCRs 30 and 30' to the cylinder head 3, and a second bracket member 72 that secures the rear ends 20b and 20b' (the end closer to the SCRs 30 and 30') of the DPFs 20 and 20' to the first bracket member 71. In other words, the rear ends 20*b* and 20*b*' of the DPFs 20 and 20' are fixed to the cylinder head 3 via the second bracket member 72 and the first bracket member 71.

As shown in FIGS. 7 and 8, a lower end 71*a* of the first bracket member 71 is fastened with bolts to the rear end of the cylinder head 3. The first bracket member 71 has a flat mount surface 71*b* at its upper end.

On the other hand, as shown in FIGS. 7 and 8, the second bracket member 72 has a substantially rectangular-shaped base portion 73 attached to the upper side of the flat mount surface 71*b* of the first bracket member 71, and a mount portion 75 which rises orthogonally from the end of the base portion 73 so as to form a substantially L-shaped cross section along with the base portion 73 and is attached to the rear ends 20*b* and 20*b*' of the DPFs 20 and 20'. The second bracket member 72 can be of any configuration as long as it has at least the base portion 73 and the mount portion 75 that form a substantially L-shaped cross section together.

Figure 10:
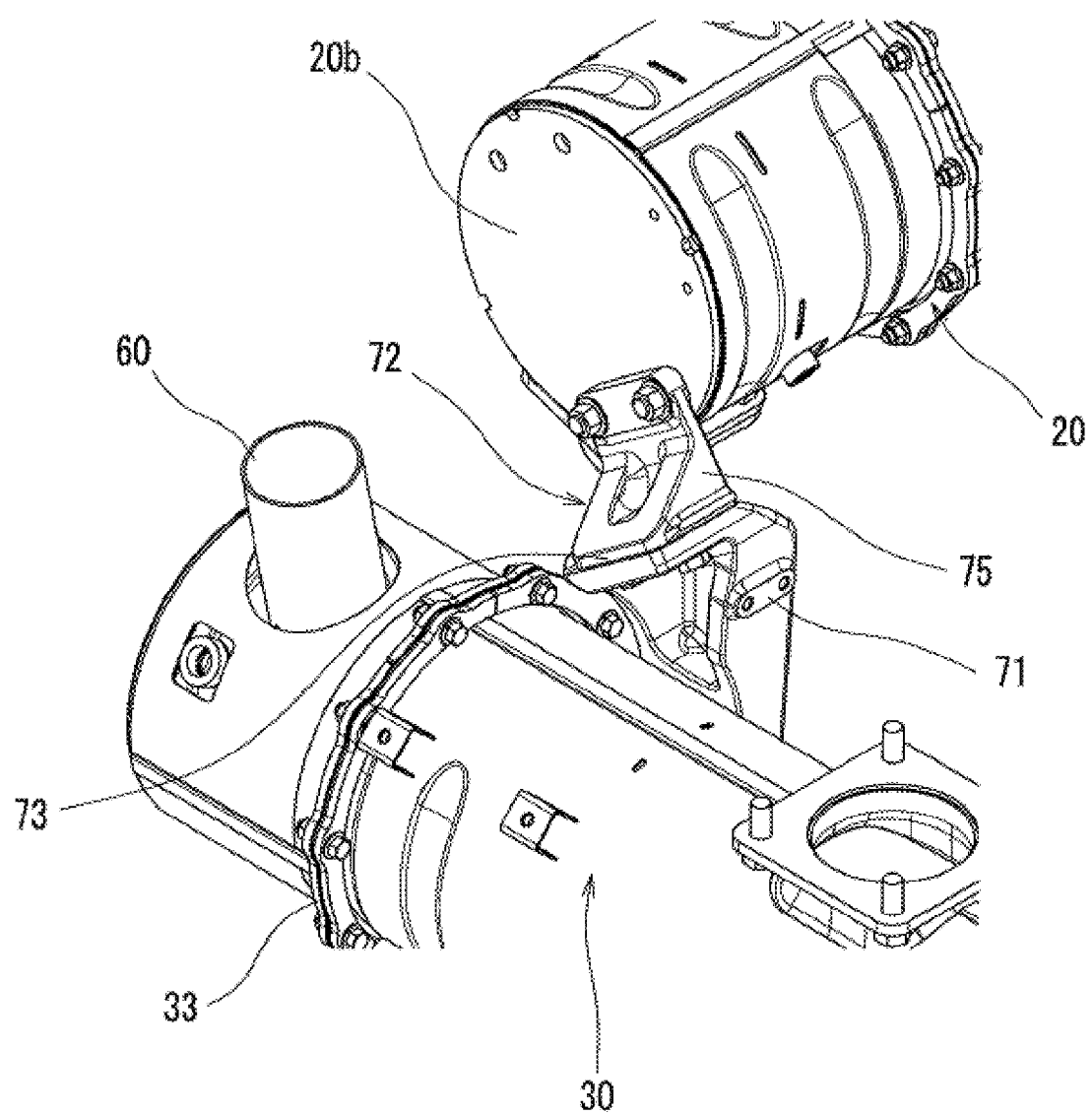
FIG. 10 is a perspective view schematically illustrating a bracket in the diesel engine shown in FIG. 1.
Figure 11:
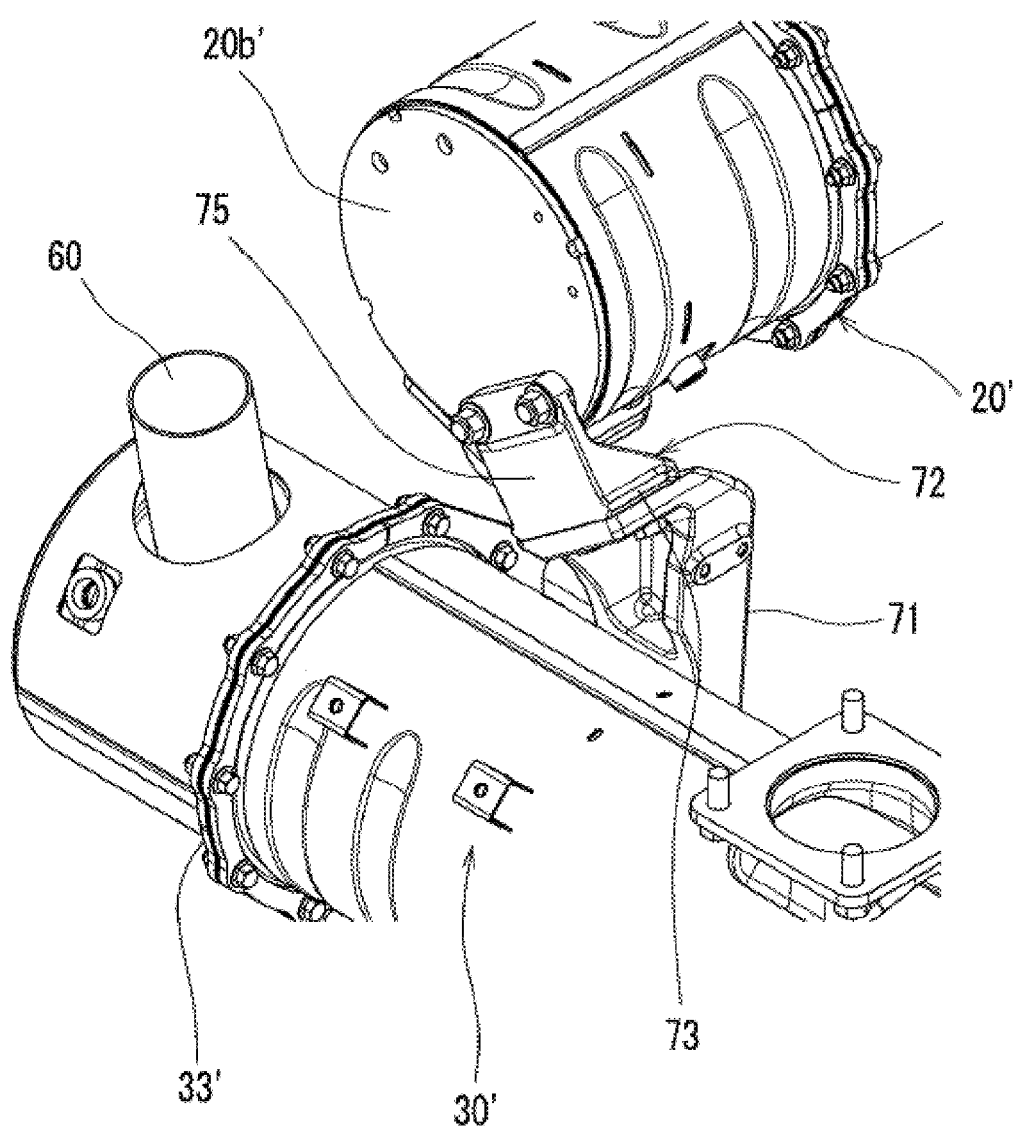
FIG. 11 is a perspective view schematically illustrating a bracket in the diesel engine shown in FIG. 5.

FIG. 10 is a perspective view schematically illustrating the bracket 70 in the diesel engine 1, and FIG. 11 is a perspective view schematically illustrating the bracket 70 in the diesel engine 1B. The base portion 73 is configured to be able to be fastened with bolts to the first bracket member 71 with any of postures in which as shown in FIGS. 7 and 10, the inside of the L shape faces the SCR 30 side (the mount portion 75 is on the front side in the engine front-rear direction and the base portion 73 is on the rear side in the engine rear-back direction), and in which as shown in FIGS. 8 and 11, the inside of the L shape faces the DPF 20 side (the base portion 73 is on the front side in the engine front-rear direction and the mount portion 75 is on the rear side in the engine rear-back direction). The mount portion 75 is configured to be able to be fastened with bolts to the rear ends 20*b* and 20*b*' of the DPFs 20 and 20' at any of surfaces which is, as shown in FIGS. 7 and 10, the outside of the L shape (surface opposite to the base portion 73 in the mount portion 75), and which is, as shown in FIGS. 8 and 11, the inside of the L shape (the same side surface as the base portion 73 in the mount portion 75).

As described above, in both diesel engine 1 and diesel engine 1B, the front ends 20*a* and 20*a*' of the DPFs 20 and 20' are fixed to the front end of the cylinder head 3 via the DPF bracket 90. Since the DPF 20' of the diesel engine 1B is longer than the DPF 20 of the diesel engine 1 in the engine front-rear direction, as shown in FIGS. 7 and 10, the rear end 20*b* of the DPF 20 in the diesel engine 1 stops before the SCR 30 in the engine front-rear direction. On the other hand, as shown in FIGS. 7 and 10, the rear end 20*b*' of DPF 20' in diesel engine 1B overlaps a part of the SCR 30' in plan view. This means that the rear ends 20*b* and 20*b*' of the DPFs 20 and 20' are closer to the SCRs 30 and 30' in diesel engine 1B than in diesel engine 1.

Therefore, in the diesel engine 1, as shown in FIGS. 7 and 10, the base portion 73 is fastened with bolts to the mount surface 71*b* of the first bracket member 71 with a posture that the inside of the L shape faces the SCR 30 side, as well as the outside of the L shape of the mount portion 75 is fastened with bolts to the rear end 20*b* of the DPF 20. This makes it possible to fix the relatively short DPF 20 to the cylinder head 3 via the second bracket member 72 and the first bracket member 71.

In contrast, in the diesel engine 1B, as shown in FIGS. 8 and 11, the base portion 73 is fastened with bolts to the mount surface 71*b* of the first bracket member 71 with a posture that the inside of the L shape faces the DPF 20 side, as well as the inside of the L shape of the mount portion 75 is fastened with bolts to the rear end 20*b* of the DPF 20. This makes it possible to fix the relatively short DPF 20' to the cylinder head 3 via the second bracket member 72 and the first bracket member 71.

In this way, the second bracket member 72 is configured to be able to fix the DPFs 20 and 20' with different lengths to the first bracket member 71 by changing a mounting orientation to the first bracket member 71.

This makes it possible to fix the DPFs 20 and 20' even whose lengths are different to the cylinder head 3 without changing the shape, etc. of the first bracket member 71 and the second bracket member 72, in other words, using the same bracket 70. Therefore, even when the lengths of the DPFs 20 and 20' are different, there is no need to manufacture a dedicated bracket every time, thereby reducing the manufacturing cost from increasing.

The base portion 73 may be configured to be fastened to the mount surface 71*b* of the first bracket member 71 via bolts that are inserted through a long hole (not shown) formed in the base portion 73.

This configuration allows the same bracket 70 to be used to handle the DPFs 20 and 20' with various lengths, since a distance between the mount portion 75 and the rear ends 20*b* and 20*b*' of the DPFs 20 and 20' can be largely adjusted by changing the posture of the base portion 73 as well as the long hole enables the distance between the mount portion 75 and the rear ends 20*b* and 20*b*' of the DPFs 20 and 20' to be finely adjusted.

Figure 12:
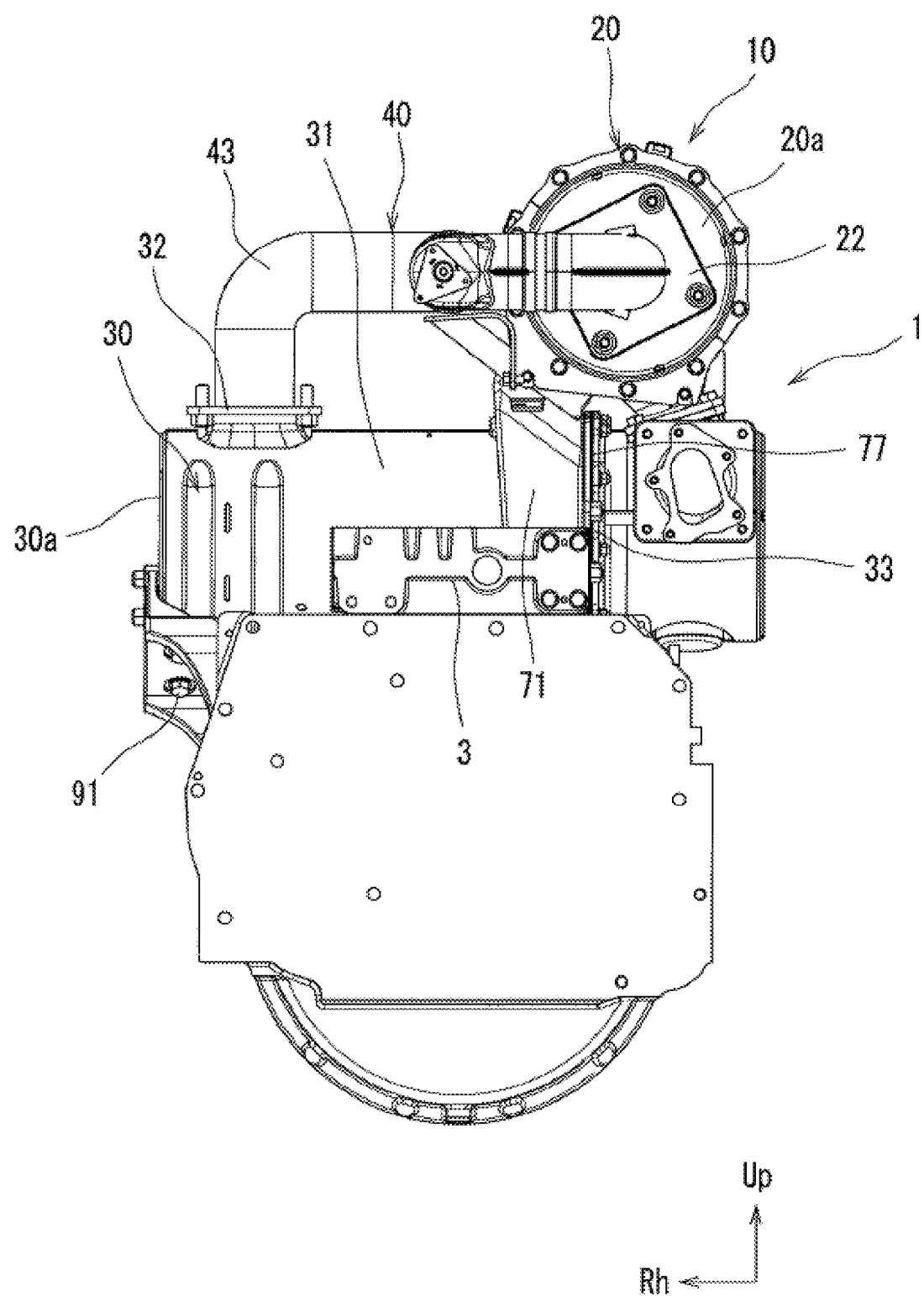
FIG. 12 is a front view seen from the front side in the front-rear direction of the engine, which schematically illustrates a main part of the diesel engine shown in FIG. 1.
Figure 13:
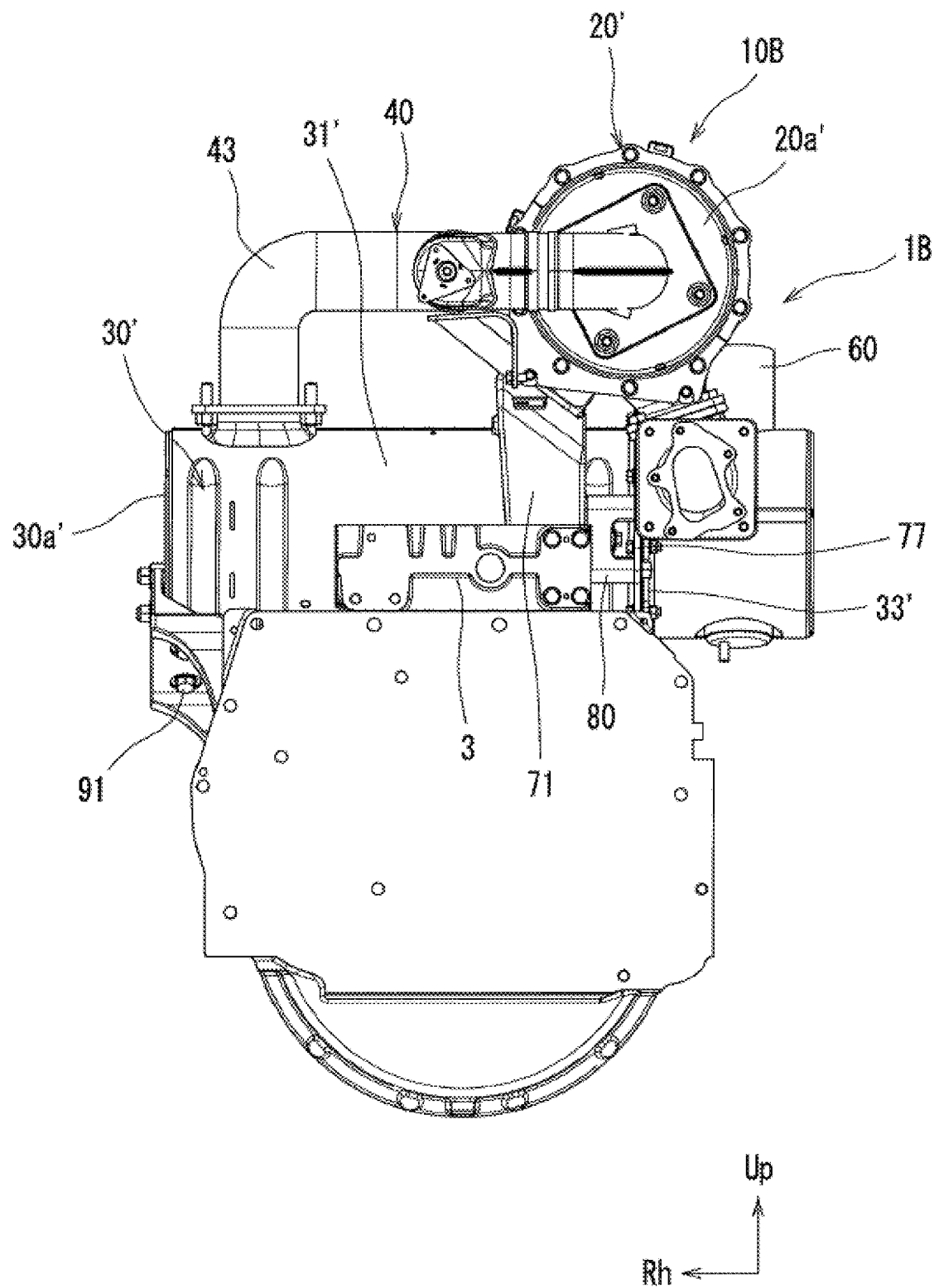
FIG. 13 is a front view seen from the front side in the front-rear direction of the engine, which schematically illustrates a main part of the diesel engine shown in FIG. 5.
Figure 14:
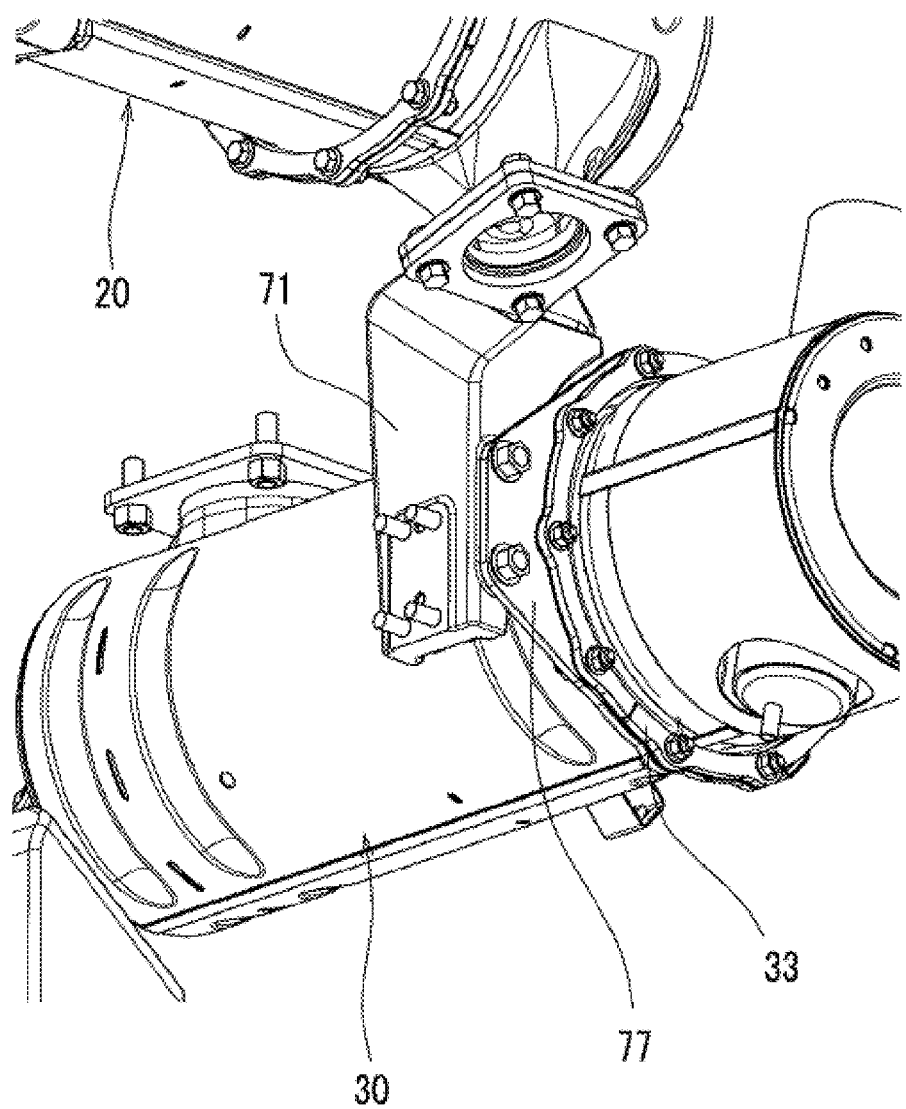
FIG. 14 is a perspective view schematically illustrating a mounting form of the first bracket member in the diesel engine shown in FIG. 1.
Figure 15:
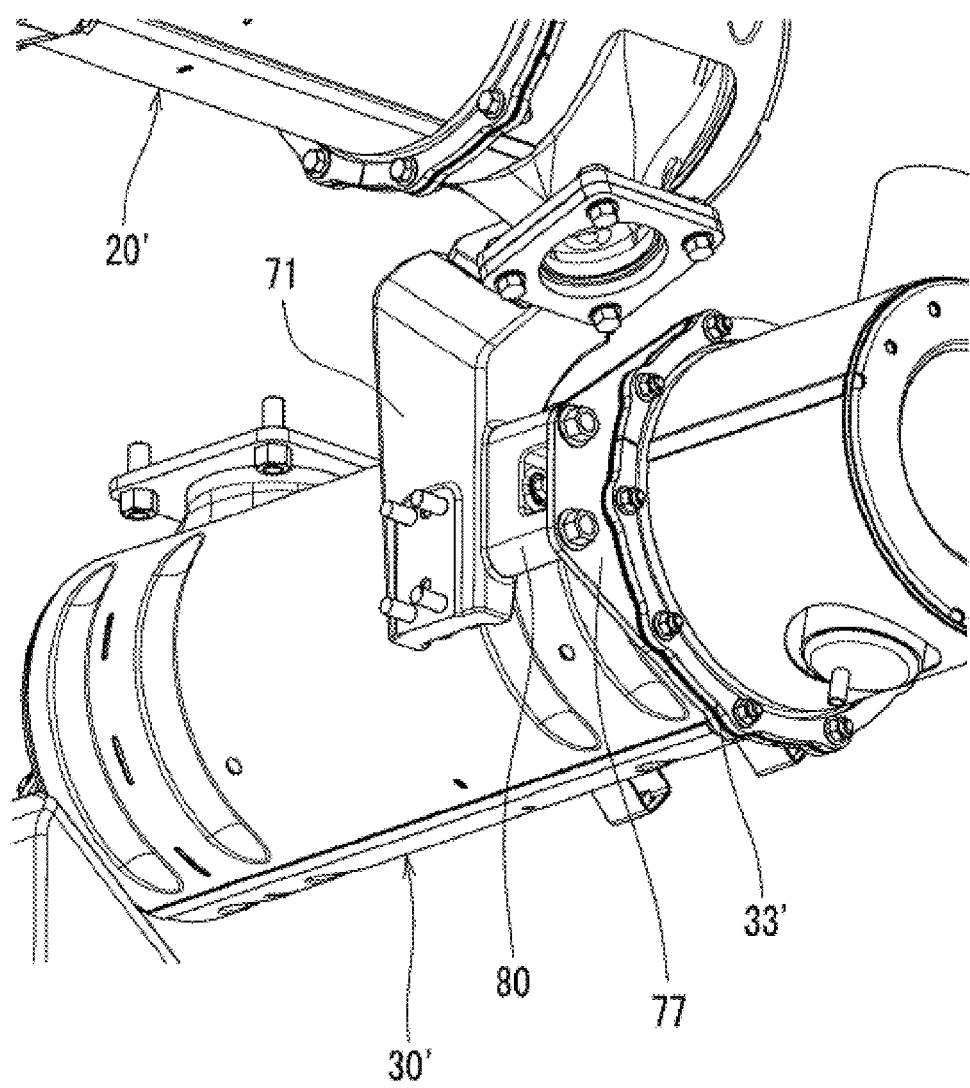
FIG. 15 is a perspective view schematically illustrating a mounting form of the first bracket member in the diesel engine shown in FIG. 5.

FIG. 12 is a front view seen from the front side in the engine front-rear direction, which schematically illustrates a main part of the diesel engine 1, and FIG. 13 is a front view seen from the front side in the engine front-rear direction, which schematically illustrates a main part of the diesel engine 1B. FIG. 14 is a perspective view schematically illustrating a mounting form of the first bracket member 71 in the diesel engine 1, and FIG. 15 is a perspective view schematically illustrating a mounting form of the first bracket member 71 in the diesel engine 1B. For simplicity of drawing, the DPF bracket 90 is omitted in FIGS. 12 and 13.

As mentioned above, in both diesel engine 1 and diesel engine 1B, the right ends 30*a* and 30*a*' of the SCRs 30 and 30' are fixed to the right end of the flywheel housing 5 via the SCR bracket 91. Since the SCR 30' of the diesel engine 1B is longer in the engine width direction than the SCR 30 of the diesel engine 1, as can be seen from FIGS. 12 and 13, the flange portion 33' of the SCR 30' in the diesel engine 1B is further away from the first bracket member 71 in the engine width direction than the flange portion 33 of the SCR 30 in the diesel engine 1.

Therefore, in the present embodiment, the first bracket member 71 is configured to be able to be mounted on a mounting member 77 fixed to the flange portions 33 and 33' of the SCRs 30 and 30' directly or via a spacer 80. In more detail, as shown in FIGS. 12 and 14, in the diesel engine 1, a substantially arc-shaped mounting member 77 with a larger diameter than the flange portion 33 is fastened with bolts to the flange portion 33 of the SCR 30, and the first bracket member 71 is fastened with bolts directly to the mounting member 77. This allows the flange portion 33 of the relatively short SCR 30 to be connected to the first bracket member 71 and secured to the cylinder head 3 via the first bracket member 71.

In contrast, as shown in FIGS. 13 and 15, in the diesel engine 1B, the mounting member 77 is fastened with bolts to the flange portion 33' of the SCR 30', and the first bracket member 71 is fastened with bolts to the mounting member 77 via the spacer 80. This allows the flange portion 33' of the relatively long SCR 30' to be connected to the first bracket member 71 and secured to the cylinder head 3 via the first bracket member 71.

This allows the same bracket 70 to be used to secure the SCRs 30 and 30' to the cylinder head 3, even when the lengths of the SCRs 30 and 30' are different.

Other Embodiments

It should be noted that the present invention is not limited to the embodiments, and can be carried out in various other forms without departing from a spirit or main features of the present invention.

In the embodiment mentioned above, in the diesel engines 1, 1A, 1B, and 1C, the cooling fan 7 side is defined as the front side in the engine front-rear direction, and the flywheel side is defined as the rear side in the engine front-rear direction. However, the front-rear direction of the diesel engines 1, 1A, 1B, and 1C does not necessarily coincide with the front-rear direction of the work vehicle on which the diesel engines 1, 1A, 1B, and 1C are mounted. For example, the diesel engines 1, 1A, 1B, and 1C may be mounted on the work vehicle so that the front-rear direction of the diesel engines 1, 1A, 1B, and 1C coincides with the front-rear direction of the work vehicle, or the diesel engines 1, 1A, 1B, and 1C may be mounted on the work vehicle so that the front-rear direction of the diesel engines 1, 1A, 1B, and 1C coincides with the body-width direction of the work vehicle.

Furthermore, in the embodiment mentioned above, the cylinder head 3 is configured in such a way that the left side in the engine width direction is defined as the exhaust side, and the right side in the engine width direction is defined as the intake side. However, the configuration is not limited thereto, and the cylinder head 3 may be configured in such a way that the right side in the engine width direction is defined as the exhaust side, and the left side in the engine width direction is defined as the intake side.

Thus, the embodiments described above are merely examples in all respects, and should not be restrictively construed. Furthermore, modifications and changes deemed to be within a range of the equivalents of the claims all fall within the scope of the present invention. The present application claims the benefit of priority to Japanese Patent Application No. 2020-192649, filed with the JPO as of Nov. 19, 2020. The entirety thereof is incorporated herein by reference.

INDUSTRIAL APPLICABILITY

According to the present invention, since the maintainability thereof can be improved even if both the DPF and the SCR are provided as exhaust after-treatment devices, it is extremely beneficial to apply the present invention to the diesel engines equipped with the exhaust after-treatment devices.

DESCRIPTION OF REFERENCE NUMERALS

1, 1A, 1B, 1C Diesel engine
3 Cylinder head
10, 10A, 10B, 10C Exhaust after-treatment device
20, 20' DPF
20b, 20b' Rear end
22 Exhaust outlet
30, 30' SCR
32 Exhaust inlet
33, 33' Flange
40, 40' SCR pipe
42 Straight pipe section
43, 43' Downstream pipe section
70 Bracket
71 First bracket member
72 Second bracket member
73 Base portion
75 Mount portion
77 Mounting member
80 Spacer
CS Crankshaft (crank shaft)

The invention claimed is:

1. A diesel engine equipped with an exhaust after-treatment device to purify exhaust gas, wherein
   the exhaust after-treatment device has a first case and a second case for treating the exhaust gas,
   the first case is located extending in an engine front-rear direction parallel to a crankshaft,
   the second case is located extending in an engine width direction orthogonal to both the engine front-rear direction and an up-down direction, on one side of the engine front-rear direction with respect to the first case, and
   the first case and the second case are attached to a cylinder head of the diesel engine, and
   the first case has an exhaust outlet at an end on a far side from the second case in the engine front-rear direction to discharge the exhaust gas after a particulate matter is collected, and
   a second case pipe connects the exhaust outlet of the first case and an exhaust inlet of the second case.

2. The diesel engine according to claim 1, wherein
   the first case is Diesel Particulate Filter (DPF) that collects the particulate matter contained in the exhaust gas, and
   the second case is a Selective Catalytic Reduction (SCR) that reduces nitrogen oxides contained in the exhaust gas by adding urea.

3. A diesel engine equipped with an exhaust after-treatment device to purify exhaust gas, wherein
   the exhaust after-treatment device has a DPF and a SCR for treating the exhaust gas,
   the DPF is located extending in an engine front-rear direction parallel to a crankshaft and collects particulate matter contained in the exhaust gas,
   the SCR is located extending in an engine width direction orthogonal to both the engine front-rear direction and an up-down direction, on one side of the engine front-rear direction with respect to the first case, and reduces nitrogen oxides contained in the exhaust gas by adding urea,
   the DPF and the SCR are attached to a cylinder head of the diesel engine,
   the DPF has an exhaust outlet at an end on a far side from the SCR in the engine front-rear direction to discharge the exhaust gas after the particulate matter is collected, and
   an SCR pipe connects the exhaust outlet of the DPF and an exhaust inlet of the SCR.

4. A diesel engine equipped with an exhaust after-treatment device to purify exhaust gas, wherein
   the exhaust after-treatment device has a first case and a second case for treating the exhaust gas,
   the first case is located extending in an engine front-rear direction parallel to a crankshaft, the second case is located extending in an engine width direction orthogonal to both the engine front-rear direction and an up-down direction, on one side of the engine front-rear direction with respect to the first case, the first case and the second case are attached to a cylinder head of the diesel engine, and the diesel engine further comprises a single bracket is provided to secure both the first case and the second case to the diesel engine.

5. The diesel engine according to claim 4, wherein the single bracket has
   a first bracket part to fix the second case to the diesel engine and
   a second bracket part to fix an end of the first case to the diesel engine, the end being located closer to the second case where the first bracket part is located.

6. The diesel engine according to claim 5, wherein the second bracket part has at least a base portion attached to the first bracket part and a mount portion rising from an end of the base portion and attached to the end of the first case closer to the second case, the base portion is attachable to the first bracket part with various postures in which a base portion side of the mount portion faces a first case side and the base portion side of the mount portion faces a second case side, and the mount portion is attachable to the end of the first case closer to the second case at any of a surface on a base portion side of the mount portion and a surface opposite to the base portion side of the mount portion.

7. The diesel engine according to claim 6, wherein the base portion is attached to the first bracket member via a fastening member that is inserted through a long hole formed in the base portion.

8. The diesel engine according to claim 5, wherein the first bracket member is attached directly or via a spacer to a mounting member fixed to a flange provided on the second case.

* * * * *